(12) United States Patent
Chew et al.

(10) Patent No.: US 11,514,899 B2
(45) Date of Patent: Nov. 29, 2022

(54) USING MULTIPLE LANGUAGES DURING SPEECH TO TEXT INPUT

(71) Applicant: MOTOROLA SOLUTIONS, INC., Chicago, IL (US)

(72) Inventors: Yen Hsiang Chew, Bayan Lepas (MY); Chin Chuan Yap, Bayan Lepas (MY); Syed Mohamed Mooulana Jamaluddin, Bangalore (IN); Lee Sun Ooi, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 360 days.

(21) Appl. No.: 16/747,857

(22) Filed: Jan. 21, 2020

(65) Prior Publication Data
US 2021/0225368 A1 Jul. 22, 2021

(51) Int. Cl.
| | | |
|---|---|---|
| G10L 15/00 | (2013.01) | |
| G10L 15/26 | (2006.01) | |
| G06F 3/04842 | (2022.01) | |
| G10L 15/183 | (2013.01) | |
| G06F 3/0484 | (2022.01) | |
| G06F 3/16 | (2006.01) | |
| G10L 15/22 | (2006.01) | |
| G06F 3/0481 | (2022.01) | |

(52) U.S. Cl.
CPC ......... *G10L 15/183* (2013.01); *G06F 3/0481* (2013.01); *G06F 3/0484* (2013.01); *G06F 3/167* (2013.01); *G10L 15/005* (2013.01); *G10L 15/22* (2013.01)

(58) Field of Classification Search
USPC ........................................ 704/1–10, 200–275
See application file for complete search history.

(56) References Cited

U.S. PATENT DOCUMENTS

| | | | |
|---|---|---|---|
| 7,050,979 B2 * | 5/2006 | Mizutani | G06F 40/58 |
| | | | 704/277 |
| 8,290,775 B2 | 10/2012 | Etezadi et al. | |
| 2018/0330732 A1 * | 11/2018 | Dasgupta | G06F 3/04817 |
| 2020/0020319 A1 * | 1/2020 | Malhotra | G10L 15/26 |
| 2020/0168212 A1 * | 5/2020 | Cherepanov | G10L 15/19 |
| 2020/0184158 A1 * | 6/2020 | Kuczmarski | G06N 3/084 |
| 2021/0314064 A1 * | 10/2021 | Cromarty | H04B 10/1149 |

* cited by examiner

*Primary Examiner* — Marcellus J Augustin

(57) ABSTRACT

A method and apparatus for correcting a wrongly-translated word in a device employing speech recognition is provided herein. During operation, a device will use a second language to correct a wrongly-translated word that was wrongly translated using a first language. More particularly, after speech recognition is performed using the first language, when a user selects text to be corrected, the user will utter the speech again using the second language that differs from the first language. Both the first and the second language can be used by the device to determine a best translation of the speech.

9 Claims, 3 Drawing Sheets

US 11,514,899 B2

USING MULTIPLE LANGUAGES DURING SPEECH TO TEXT INPUT

BACKGROUND OF THE INVENTION

Speech recognition is an interdisciplinary subfield of computational linguistics that develops methodologies and technologies that enables the recognition and translation of spoken language into text by computers. "Speech recognition" is also known as automatic speech recognition, computer speech recognition, or speech to text. Speech recognition receives a user's voice input, and outputs what the user said as text.

Speech recognition may produce an erroneous translation of a user's speech. When this happens, a person may need to make correction at places where the translation is wrong. This is usually accomplished by selecting the wrongly-translated word and reiterating the word. However, reiterating the word may not produce a satisfactory translation since there is a high probability that the word will again be translated incorrectly. Therefore, a need exists for more accurately correcting a wrongly-translated word.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for correcting a wrongly-translated word in a device employing speech recognition is provided herein. During operation, a device will use a second language to correct a wrongly-translated word that was wrongly translated using a first language. More particularly, after speech recognition is performed using the first language, when a user selects text to be corrected, the user will utter the speech again using the second language that differs from the first language. Both the first and the second language can be used by the device to determine a best translation of the speech.

Figure 1:
FIG. 1 is a general operating environment for speech-to-text translation.
Figure 2:
FIG. 2 is a general operating environment for speech-to-text translation.
Figure 3:
FIG. 3 is a general operating environment for speech-to-text translation.

As an example of the above, consider FIG. 1 through FIG. 3. These figures show device 101 (such as a smartphone) using speech as an input, and outputting text to an application (for example, a texting application). During operation, a person may say (in English) "I saw a person on First Street wearing a yellow bandana and carrying a gun". As shown in FIG. 1, automatic speech recognition translated the user's speech as "I saw a person on First Street wearing a yellow banana and carrying a gun".

In order to correct the term "banana", the user may select the wrongly-translated text as shown in FIG. 2, and again speak the word "bandana", however, instead of speaking the term in the original language, the term will be spoken in a second language (for example, Spanish) differing from the first language. Thus, the user will select the wrongly-translated word as shown in FIG. 2, and utter "pañuelo" (bandana in Spanish).

Device 101 will "expect" the speech received to correct the word to be in the second language, so the corrected word must be spoken in the second language. Both the first language and the second language will be used to determine an appropriate correction of the word. For example, the most-likely candidates for the English translation will be used along with the most-likely candidates for the Spanish translation to determine those translations that are similar. The common similar candidate may be used as the corrected word. This is shown in FIG. 3.

It should be noted that while the first language and the second language were English and Spanish, respectively, this does not have to be the case. Any language can be used as the first language and the second language, as long as the first and the second languages differ.

It should also be noted that while a single word may be selected for correction, user may also select a sentence comprising multiple words, or select a paragraph comprising multiple sentences for correction.

As is evident, device 101 will need to know when to use the first language and the second language when performing speech recognition. In one embodiment, the second language will automatically be used when a word is selected. In other words, device 101 will perform speech recognition using the first language until a word is selected, then it will perform speech recognition using the second language. The selection (e.g., highlighting) of the word serves as a trigger to switch to using the second language in performing speech recognition. Thus, the second language will only be used by logic circuitry for speech recognition when a word is selected. When no word is selected, the first language will be used in performing speech recognition.

Selecting a word may be accomplished via many techniques as known in the art. For example, on a touch screen, a long hold may select a word. When using a mouse, a double-click on the mouse may select a word, . . . , etc.

It should also be noted that even though device 101 uses the second language for performing speech to text and determine an appropriate correction, any text output is in the first language. So, even though the user uttered "pañuelo", the text "bandana", is output in the first language.

In another embodiment, user may select a wrongly translated text from a GUI and re-iterate a word in the second language followed by the same word in the original language with a brief pause in between. Scoring for a most-likely corrected word candidate may be enhanced by including the expressed meaning of the re-iterated word in the second language as additional inputs for speech to text translation in the original language.

In embodiments, the language order of a user's speech may be changed, whereby user may select a wrongly translated text from a GUI and re-iterate a word in the original language followed by the same word in the second language.

In a similar example; a person may say "I saw a person on First Street wearing a yellow bandana and carrying a gun"; which gets translated into "I saw a person on First Street wearing a yellow banana and carrying a gun". In order to correct the term "banana", user may select the wrongly-translated text and again speak the word "pañuelo" (Spanish) followed by "bandana" (English) with a brief pause in between. Speech to text translation module in device 101 determines a list of candidates for the corrected word based on user's spoken "bandana"; which may include both "bandana" and "banana". However, user's spoken "pañuelo" indicates to the speech to text translation module that the corrected word should have a meaning that closely resembles an article of clothing and not a fruit; which invokes the speech to text translation module to pick "bandana" instead of "banana" as the corrected word.

Figure 4:
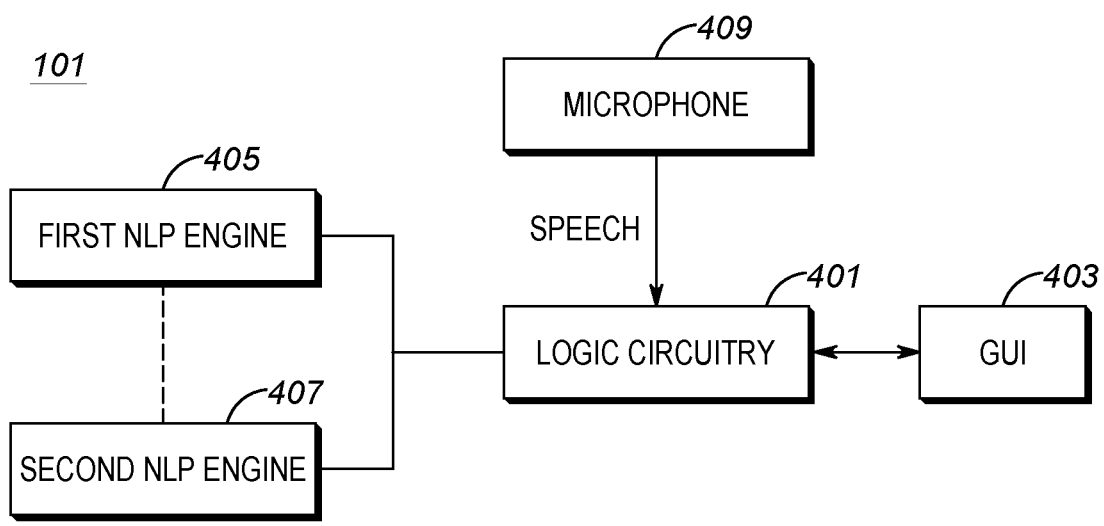
FIG. 4 is a block diagram of the device shown in FIG. 1.

FIG. 4 is a block diagram of device 101 that performs speech recognition as described above. As shown, device 101 may include a first Natural Language Processing engine (NLP engine) 405, a second NLP engine 407, logic circuitry 401 and Graphical User Interface (GUI) 403. In other implementations, device 101 may include more, fewer, or different components. Regardless, all components are connected via common data busses as known in the art.

NLP engines 405 and 407 comprise well known circuitry to analyze, understand, and derive meaning from human language in a smart and useful way. By utilizing NLP engines 405 and 407, automatic speech recognition takes place. First NLP engine 405 utilizes a first language in performing speech recognition. In other words, NLP engine 405 receives a first language as an input, and outputs text in the first language. Second NLP engine 407 utilizes a second language in performing speech recognition. In other words, NLP engine 407 receives a second language as an input, and outputs text in the first language.

Microphone 409 comprises a device that transforms a user's voice vibrations in the air into electronic representations of the voice.

GUI 403 comprises a man/machine interface for receiving an input from a user and displaying information. For example, GUI 403 may provide a way of conveying (e.g., displaying) text received from logic circuitry 401. The text preferably comprises text output by an NLP engine. In order to provide the above features (and additional features), GUI 403 may comprise any combination of a touch screen, a computer screen, a keyboard, or any other interface combination needed to receive a user input and provide information to the user. In a preferred embodiment, GUI 403 at least comprises a display and a keypad.

Logic circuitry 401 comprises a digital signal processor (DSP), general purpose microprocessor, a programmable logic device, or application specific integrated circuit (ASIC) and is configured to receive speech from a microphone and route the received speech to the appropriate NLP engine. More specifically, logic circuitry 401 serves to determine if a word is selected on GUI 403, and routes speech to either the first or the second NLP engine based on whether or not the word is selected. In this particular function, logic circuitry 401 may be thought of as a switch, routing received speech to first NLP engine 405 when a word is not selected on GUI 403, and routing received speech to second NLP engine 407 when a word is selected on GUI 403.

As described, apparatus 101 comprises first language-processing engine 405 configured to perform speech recognition on speech received in a first language and output recognized speech as text in the first language. Second language-processing engine 407 is provided and configured to perform speech recognition on speech received in the second language and output recognized speech as text in the first language. Graphical-user interface (GUI) 403 is provided and configured to display text in the first language and also select the text in the first language. Logic circuitry 401 is provided and configured to use the first language-processing engine to perform speech recognition using the first language, outputting the text in the first language to the GUI, determine that the text in the first language has been selected on the GUI, receive additional speech in the second language, provide the additional speech received in the second language to the second language-processing engine, receive additional text in the first language that identifies the additional speech received in the second language, and replace the selected text in the first language with the additional text in the first language.

As discussed above, the selected text on the GUI serves as a trigger for the logic circuitry to provide the additional speech received in the second language to the second language-processing engine. With this in mind, GUI 403 is configured to display and select text received from the first and the second NLP engine (received via logic circuitry 401), and logic circuitry is configured to receive voice as an input and route the voice to the first NLP engine if a word is not selected on the GUI, and also configured to route the voice to the second NLP engine if a word is selected on the GUI. The logic circuitry is also configured to instruct GUI 403 to replace a selected word with additional text received by the second NLP engine.

In another embodiment, the selected text on the GUI serves as a trigger for logic circuitry to delimit the speech received into a first segment and a second segment; wherein the first segment comprises speech in the second language and the second segment comprising speech in the first language.

Logic circuitry is further configured to provide the delimited speech in the first language as a first input to a first NLP engine; and to provide the delimited speech in the second language as input to a second NLP engine.

Second NLP engine is configured to compute an output comprising an expressed meaning for the delimited speech in the second language and provide the output in the first language as a second input to the first NLP engine.

The logic circuitry is further configured to replace the selected text in the first language with additional text in the first language; wherein the additional text is determined by first NLP engine based in part from the first and the second inputs to first NLP engine. For example, the additional text may be determined based on a combined speech to text scoring of the first input to the first NLP engine and an expressed meaning scoring between the first and the second input to the first NLP engine.

In embodiments; first NLP engine may compare the expressed meaning between its first and second inputs to produce a composite score for selecting an appropriate additional text. For example: potential candidates for speech to text translation scoring based on a first input to first NLP engine may include: "bandana" with a score of 70% and "banana" with a score of 80%. However, a comparison of expressed meaning between the first and the second inputs of first NLP engine (for example: "banana"—fruit; and "pañuelo"—article of clothing) may produce a comparison score of 10%; while a comparison of expressed meaning between the first and the second inputs of first NLP engine (for example: "bandana"—article of clothing and "pañuelo"—article of clothing) may produce a comparison score of 95%. Hence first NLP engine may compute a composite score (e.g. weighted average of both speech to text translation score and expressed meaning comparison score) for both "banana" and "bandana"; and subsequently pick "bandana" as the additional text to replace the selected text by virtue of having a higher composite score.

Thus, in the second embodiment of the present invention the logic circuitry is configured to receive additional speech in the first language and provide the additional speech received in the first language to the first language-processing engine as well as the second language-processing engine. The second language-processing engine is configured to receive the additional speech in the second language and output recognized speech as text in the first language as an input into the first language-processing engine. The first language-processing engine is configured to receive the additional speech received in the first language and the recognized speech as text in the first language that was output by the second language processing engine to determine a best translation of the additional speech in the first language.

Figure 5:
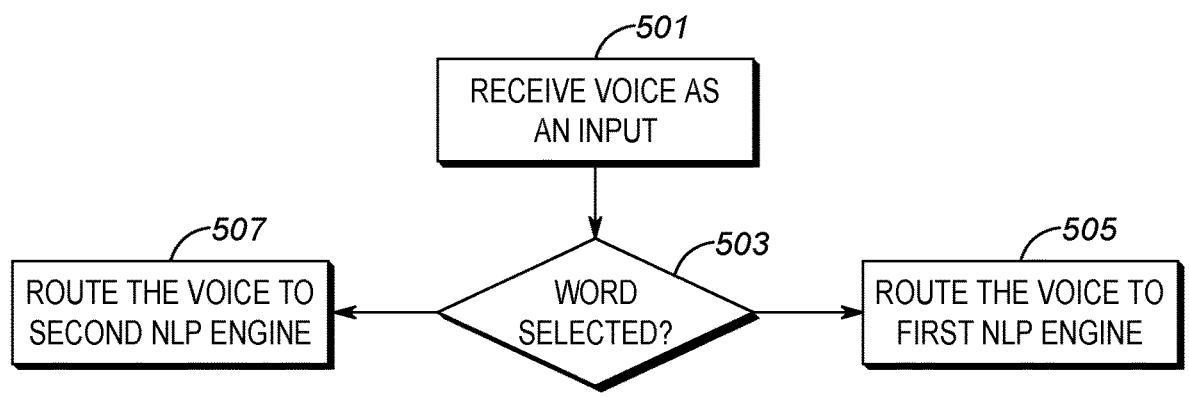
FIG. 5 is a flow chart showing operation of the device shown in FIG. 1.

FIG. 5 is a flow chart showing operation of device 101. The logic flow begins at step 501 where logic circuitry 401 receives voice as an input. As discussed above, the voice may comprise voice in a first or a second language. At step 503, logic circuitry 401 determines if a word has been selected on GUI 403. If so, logic circuitry 401 routes the voice to first NLP engine 405 (step 505) if the word is not selected on the GUI, otherwise the voice is routed to second NLP engine 407 (step 507) if a word is selected on the GUI.

As discussed, the first NLP engine is configured to receive the voice in a first language and output text in the first language, and the second NLP engine is configured to receive the voice in a second language and output text in the first language. As discussed, and text received from the second NLP engine is used to replace the selected text.

In the above-described apparatus, text received from the first NLP engine is utilized to populate GUI 403 with text in a first language. Text received from the second NLP engine is used to replace words that are selected on GUI 403 with words in the first language. Text received from the first NLP engine is never used to replace words that are selected on GUI 403 when operating in the above-described manner. (Obviously, device 101 may comprise means for switching the above functionality off).

It should be noted that the term "selected" is meant to include any modification of text that causes the text to be displayed in a way that stands out on an electronic screen (e.g., GUI 403). The modification may include forms such as highlighting, underlining, bolding, font changing, coloring, circling, boxing, book marking, . . . , etc.

As discussed above, in the second embodiment of the present invention, both the first and the second NLP engines are used to determine a proper translation for the selected word. With this in mind, additional steps of the step of receiving the voice as an input comprises the step of receiving a first and a second word as the voice input and then routing the first and the second words to the first NLP engine if the word is not selected on the GUI, otherwise routing the first word to the first NLP engine and the second word to the second NLP engine if a word is selected on the GUI. Text may then be received from the first (or second) NLP engine and replacing the selected word with the text received from the first (or second) NLP engine. As discussed above, the received text used to replace the selected word.

As discussed, in the additional embodiment, the received two words are routed such that a first word is routed to the first NLP engine and the second word is routed to the second NLP engine. Both engines can be used to determine a proper replacement for the selected word. In one embodiment the text output from the second NLP engine is routed to the first NLP engine along with the first word. In another embodiment, the text output from the first NLP engine is routed to the second NLP engine along with the second word. The first and/or the second NLP engines are then used to determine a correct word as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a first natural-language processing (NLP) engine configured to receive voice in a first language, and output text in the first language;
a second NLP engine configured to receive voice in a second language, and output text in the first language;
a graphical user interface (GUI) configured to display and select text received from the first and the second NLP engine; and
logic circuitry configured to:
receive speech;
determine whether or not text on the GUI has been selected; and
route the received speech to either the first or the second NLP engine based on whether or not text on the GUI has been selected such that when it has been determined that text has been selected, the speech is routed to the second NLP engine, and when it has been determined that text has not been selected, the speech is routed to the first NLP engine.

2. The apparatus of claim 1 wherein the logic circuitry is also configured to replace any selected word with additional text received by the second NLP engine.

3. The apparatus of claim 1 wherein the received speech comprises voice in the first language or the second language.

4. A method comprising the steps of:
receiving voice as an input;
determining if a word has been selected on a graphical user interface (GUI); and
routing the voice to either a first or a second language-processing engine based on whether or not a word on the GUI has been selected such that when it has been determined that the word has been selected, the voice is routed to the second language-processing engine, and when it has been determined that the word has not been selected, the voice is routed to the first language-processing engine.

5. The method of claim 4 wherein the first language-processing engine is configured to receive the voice in a first language and output text in the first language.

6. The method of claim 5 wherein the second language-processing engine is configured to receive the voice in a second language and output text in the first language.

7. The method of claim 6 further comprising the step of:
receiving text from the second NLP engine and replacing a selected word with text received from the second NLP engine.

8. The method of claim 4 wherein the voice comprises voice in a first language or a second language.

9. An apparatus for performing speech recognition, the apparatus comprising:
a first language-processing engine configured to perform speech recognition on speech received in a first language and output recognized speech as text in the first language;
a second language-processing engine configured to perform speech recognition on speech received in a second language and output recognized speech as text in the first language;
a graphical-user interface (GUI) configured to display text in the first language and also select text that has been displayed on the GUI;
logic circuitry configured to:
receive speech;
determine whether or not text on the GUI has been selected; and
route the received speech to either the first or the second language-processing engine based on whether or not text on the GUI has been selected such that when it has been determined that text has been selected, the speech is routed to the second language-processing engine, and when it has been determined that text has not been selected, the speech is routed to the first language-processing engine.

* * * * *